(12) United States Patent
Zhang (10) Patent No.: US 12,540,083 B1
(45) Date of Patent: Feb. 3, 2026

(54) COMBINED FILTER ELEMENT MECHANISM

(71) Applicant: Yanyan Zhang, Cixi (CN)

(72) Inventor: Yanyan Zhang, Cixi (CN)

( * ) Notice: Subject to any disclaimer, the term of this patent is extended or adjusted under 35 U.S.C. 154(b) by 0 days.

(21) Appl. No.: 19/061,674

(22) Filed: Feb. 24, 2025

(30) Foreign Application Priority Data

Jan. 14, 2025 (CN) .......................... 202520084383.9

(51) Int. Cl.
| | | |
|---|---|---|
| *C02F 1/00* | (2023.01) | |
| *C02F 1/28* | (2023.01) | |
| *C02F 1/50* | (2023.01) | |

(52) U.S. Cl.
CPC .............. *C02F 1/003* (2013.01); *C02F 1/283* (2013.01); *C02F 1/50* (2013.01); *C02F 2307/06* (2013.01)

(58) Field of Classification Search
CPC .. C02F 1/003; C02F 1/283; C02F 1/50; C02F 2307/06
USPC ................ 210/449, 264, 266, 283, 284
See application file for complete search history.

(56) References Cited

U.S. PATENT DOCUMENTS

| | | | | |
|---|---|---|---|---|
| 2,334,802 A | * | 11/1943 | Zuckermann ........ | B01D 35/04 210/284 |
| 3,519,134 A | * | 7/1970 | Hassinger ............... | C02F 1/003 210/449 |
| 6,120,686 A | * | 9/2000 | Bilz ....................... | B01J 47/026 210/275 |
| 2008/0035552 A1 | * | 2/2008 | Lee ......................... | C02F 1/003 210/446 |
| 2014/0263020 A1 | * | 9/2014 | Macdonald ............. | C02F 1/003 210/232 |

FOREIGN PATENT DOCUMENTS

| | | | | | |
|---|---|---|---|---|---|
| CN | 207412966 U | | 5/2018 | | |
| CN | 111302555 A | * | 6/2020 | ............... | C02F 9/00 |
| CN | 213790238 U | | 7/2021 | | |
| CN | 218740676 U | | 3/2023 | | |
| KR | 101902059 B1 | * | 9/2018 | ............. | C02F 1/003 |

OTHER PUBLICATIONS

English Translation of CN 111302555 A (Year: 2020).*
English Translation of KR 101902059 B1 (Year: 2018).*

* cited by examiner

*Primary Examiner* — Terry K Cecil
(74) *Attorney, Agent, or Firm* — Nitin Kaushik (57) ABSTRACT

The present disclosure claims a combined filter element mechanism, which is applied to a shower head or a faucet and comprises a housing with a hollow cavity; a cover plate detachably arranged on the housing; and a plurality of sub-filter boxes sequentially arranged in a cavity enclosed by the housing and the cover plate. Each sub-filter box is respectively provided with a filter material, and the filter materials in the plurality of sub-filter boxes are the same or different. The present disclosure facilitates the replacement of filter materials in the sub-filter boxes through the detachable connection between the housing and the cover plate as well as the detachable connection of sub-filter boxes. Users can fill corresponding filter materials according to water qualities or personal preferences, thus effectively solving the problems that the existing shower head filter element cannot perform customized filtration according to water qualities and is inconvenient for replacement.

11 Claims, 9 Drawing Sheets

COMBINED FILTER ELEMENT MECHANISM

CROSS-REFERENCE TO RELATED APPLICATIONS

The application claims priority to Chinese patent application No. 2025200843839, filed on Jan. 14, 2025, the entire contents of which are incorporated herein by reference.

TECHNICAL FIELD

The present disclosure relates to the technical field of filter elements, in particular to a combined filter element mechanism.

BACKGROUND

A shower head can be used to make water flow out in the form of small droplets or spray, making it more convenient for users to take a bath. At present, tap water is generally directly introduced into the shower head. However, there may be impurities such as sediment, rust, gel, free chlorine and pollutants such as bacteria in the tap water. Therefore, when using the shower head for bathing, users may be harmed by impurities or pollutants in the tap water.

Publication No. CN106179792B provides a shower head, which comprises a handle and a water purification assembly; the water purification assembly is disposed in the handle, and comprises a filter element for filtering impurities in water and a filter element for sterilization; the filter element for sterilization is arranged in the water outlet direction of the filter element for filtering, connected to the filter element for filtering, and used for filtering out bacteria in water; the water purification assembly is used to make the water flow through the filter element for filtering and then into the filter element for sterilization. Although with the technical solution, the tap water entering a shower head can be filtered and sterilized, however, the filter element for filtering and the filter element for sterilization are fixed in the shower head handle and cannot be customized according to water qualities. Moreover, as the use time increases, the filtering effect goes unsatisfactory; therefore, a combined filter element mechanism is provided to solve the above problems.

SUMMARY

One of the objectives of the present disclosure is to provide a combined filter element mechanism, so as to solve the problems that the existing shower head filter element cannot be customized according to water qualities and is inconvenient to replace.

The combined filter element mechanism of the present disclosure can be realized by the following technical solution:

The combined filter element mechanism of the present disclosure is applied to a shower head or a faucet, comprising a housing, which is a hollow cavity with an opening at one end; a cover plate, detachably arranged on the housing, and the cover plate and the housing form a closed hollow cavity; a plurality of sub-filter boxes, which are sequentially and detachably arranged in the closed hollow cavity, and shapes of each sub-filter box are fitted with each other;

an inner side of the cover plate forms a water storage space with an adjacent sub-filter box, and an inner side of the bottom of the housing is arranged close to the adjacent sub-filter box; and each sub-filter box is respectively provided with a filter material, and the filter materials in the plurality of sub-filter boxes are the same or different; the filter material comprises one or more of activated carbon fiber, calcium sulfite and copper-zinc alloy.

In one of the embodiments, the filter material comprises antibacterial silver ion, fragrance or mint.

In one of the embodiments, a plurality of first through-holes are arranged through one end of the housing opposite to an opening, and tap water enters and exits the housing through the plurality of first through-holes.

In one of the embodiments, an inner wall of the housing is provided with a plurality of slots.

In one of the embodiments, the cover plate comprises a cover plate body detachably engaged with the housing; and a connecting head arranged in communication with the cover plate body, which is integrally formed with the cover plate body.

In one of the embodiments, a plurality of clamping blocks are arranged on sides of the cover plate, and the clamping blocks are detachably engaged with the slots.

In one of the embodiments, a plurality of transverse stripes are arranged around the sides of the cover plate.

In one of the embodiments, the cover plate and the housing are detachably connected by magnetic attraction.

In one of the embodiments, the sub-filter box comprises a filter box body which is a hollow cavity, and the filter material is placed in the filter box body; a filter box cover plate detachably arranged on the filter box body; and both a top surface and a bottom surface of the sub-filter box are provided with an annular outer ring, so that the sub-filter box forms a stepped structure at the annular outer rings; two adjacent sub-filter boxes are stacked through the annular outer rings and form a filtration water storage space inside the annular outer rings between the adjacent sub-filter boxes.

In one of the embodiments, a plurality of first filter pores are arranged through the filter box body.

In one of the embodiments, a plurality of second filter pores are further arranged through the filter box cover plate.

In one of the embodiments, the filter box cover plate is detachably engaged with the filter box body.

In one of the embodiments, the filter box cover plate is detachably and magnetically attracted to the filter box body.

Compared with the prior art, the combined filter element mechanism of the present disclosure has the following beneficial effects:

With the combined filter element mechanism of the present disclosure, it is convenient to replace the filter material in the sub-filter box through the detachable connection between the housing and the cover plate and the detachable connection between the sub-filter boxes. Users can fill different filter materials according to various water qualities or personal preference, thus effectively solving the problems that the existing shower filter elements cannot perform customized filtration according to water qualities and are inconvenient to be replaced. The tap water passes through the filter materials in the plurality of sub-filter boxes in turn, so that a better and more thorough filtration operation can be performed on the tap water, which improves the filtration function of the filter element mechanism to a certain extent, and users can customize the filling of different filter materials, thus improving the user experience and satisfaction to a certain extent. In addition, the present disclosure has the characteristics of simple structure and convenient use.

BRIEF DESCRIPTION OF DRAWINGS

In order to more clearly illustrate the technical solution in the embodiments of the present disclosure, the drawings necessary for use in the embodiments are briefly introduced below. It should be understood that the following drawings only show some embodiments of the present disclosure and shall not be regarded as a limitation on the scope. Those skilled in the art can further obtain other related drawings based on these drawings without making creative efforts.

In the figures: 11, first housing; 111, first through-hole; 112, first slot; 12, first cover plate; 121, cover plate body; 1211, first clamping block; 122, connecting head; 13, sub-filter box; 131, filter box body; 1311, first filter pore; 132, filter box cover plate; 1321, second filter pore; 14, second housing; 141, second through-hole; 142, second slot; 15, second cover plate; 151, third through-hole; 152, second clamping block; 153, transverse stripes.

DETAILED DESCRIPTION OF THE EMBODIMENTS

In order to make the purpose, technical solutions and advantages of the embodiments of the present disclosure more clear, the technical solutions in the embodiments of the present disclosure will be clearly and completely described below with reference to the accompanying drawings in the embodiments of the present disclosure. Obviously, the embodiments described are only some not all embodiments of the present disclosure. The components of embodiments of the present disclosure generally described and illustrated in the drawings herein may be arranged and designed in a variety of different configurations.

Accordingly, the following detailed description of embodiments of the present disclosure provided in the accompanying drawings is not intended to limit the scope of the claimed present disclosure but merely represents selected embodiments of the present disclosure. Based on the embodiments described herein, all other embodiments obtained by those of ordinary skill in the art without creative work are within the scope of the present disclosure.

Referring to FIGS. 1-6, in this embodiment, a combined filter element mechanism according to the present disclosure is mainly used in a water filtration process of a shower head or a faucet, and comprises a first housing 11, a first cover plate 12 and a plurality of sub-filter boxes 13. The first housing 11 is a hollow cavity with an opening at one end; the first cover plate 12 is detachably arranged on the first housing 11, and both of them form a closed hollow cavity; a plurality of sub-filter boxes 13 are sequentially arranged in a cavity enclosed by the first housing 11 and the first cover plate 12; and shapes of each sub-filter box 13 are fitted with each other;

an inner side of the first cover plate 12 forms a water storage space with the adjacent sub-filter box 13; an inner side of the bottom of the first housing 11 is arranged close to the adjacent sub-filter box 13; the sub-filter boxes 13 are provided with filter materials, and the filter materials in the plurality of sub-filter boxes 13 are the same or different; specifically, the filter material comprises one or more of activated carbon fiber, calcium sulfite and copper-zinc alloy; in some embodiments, the filter material may include antibacterial silver ions, and the sterilization operation is performed with the antibacterial silver ions; in some other embodiments, the filter material may include fragrance or mint; a user can customize and add different filter materials according to water qualities and personal preferences.

Figure 1:
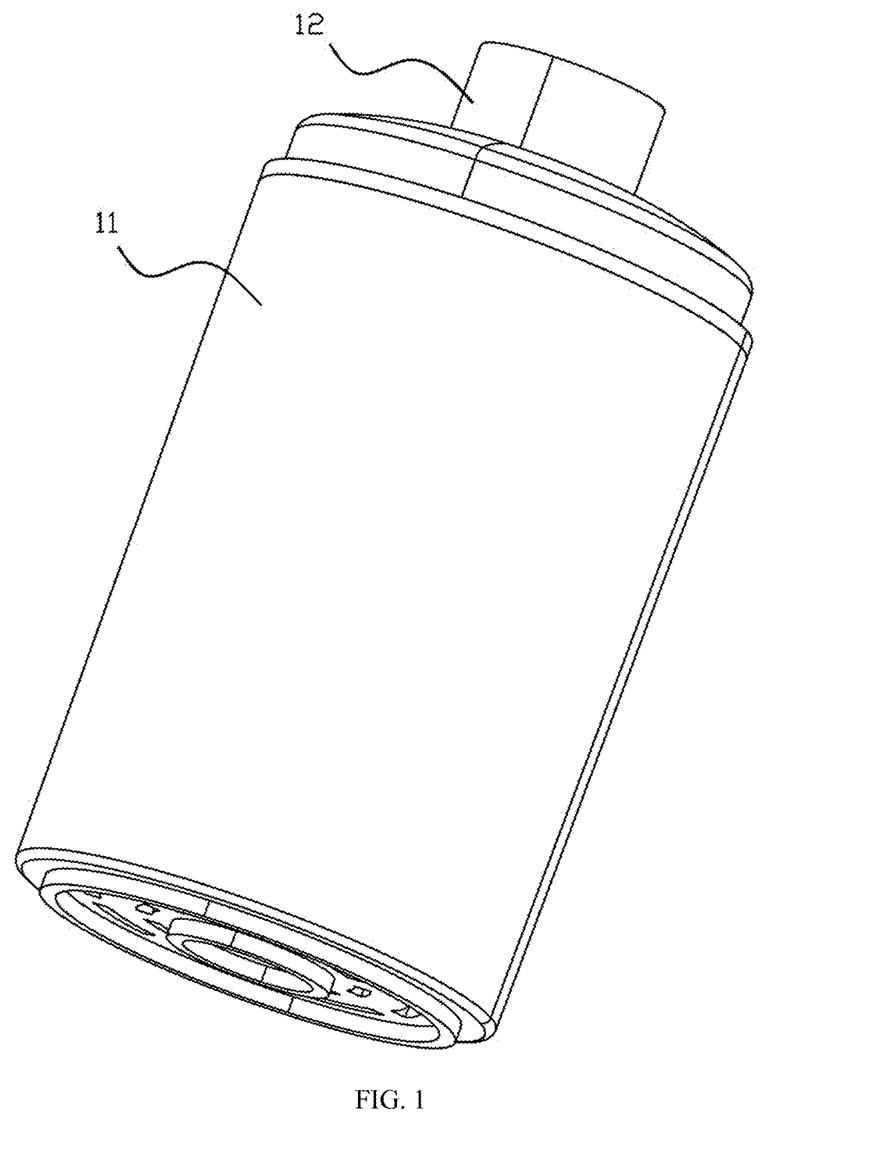
FIG. 1 is a schematic structural diagram of a first embodiment of a combined filter element mechanism according to the present disclosure.
Figure 2:
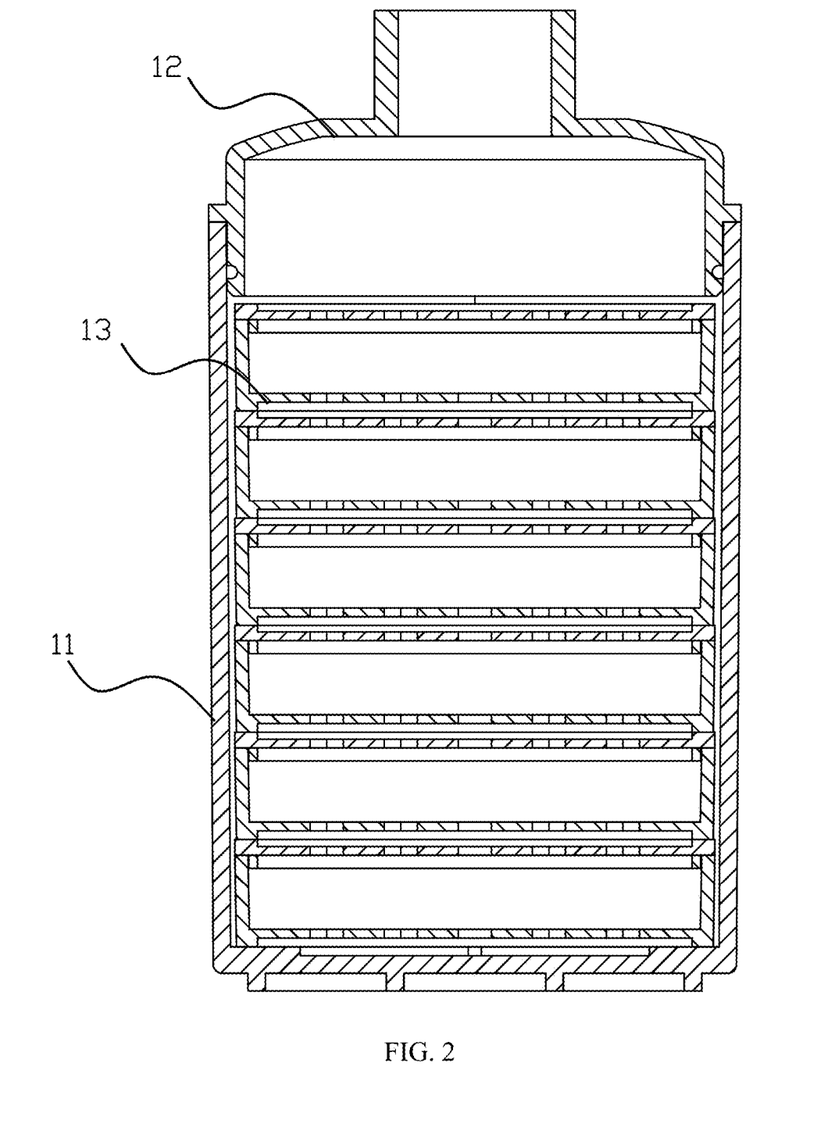
FIG. 2 is a schematic structural diagram of the first embodiment of the combined filter element assembly shown in FIG. 1 from a cross-sectional view.
Figure 3:
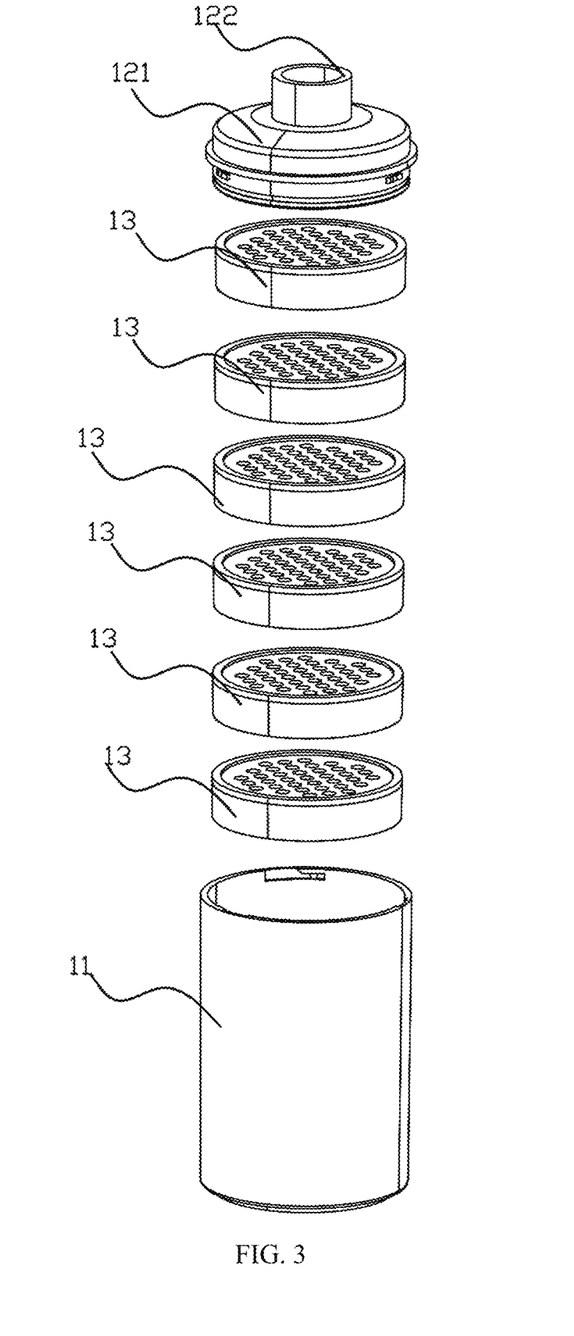
FIG. 3 is an schematic structural diagram of the first embodiment of the combined filter element mechanism shown in FIG. 1 from an exploded view, which includes a first housing, a first cover plate and sub-filter boxes.
Figure 4:
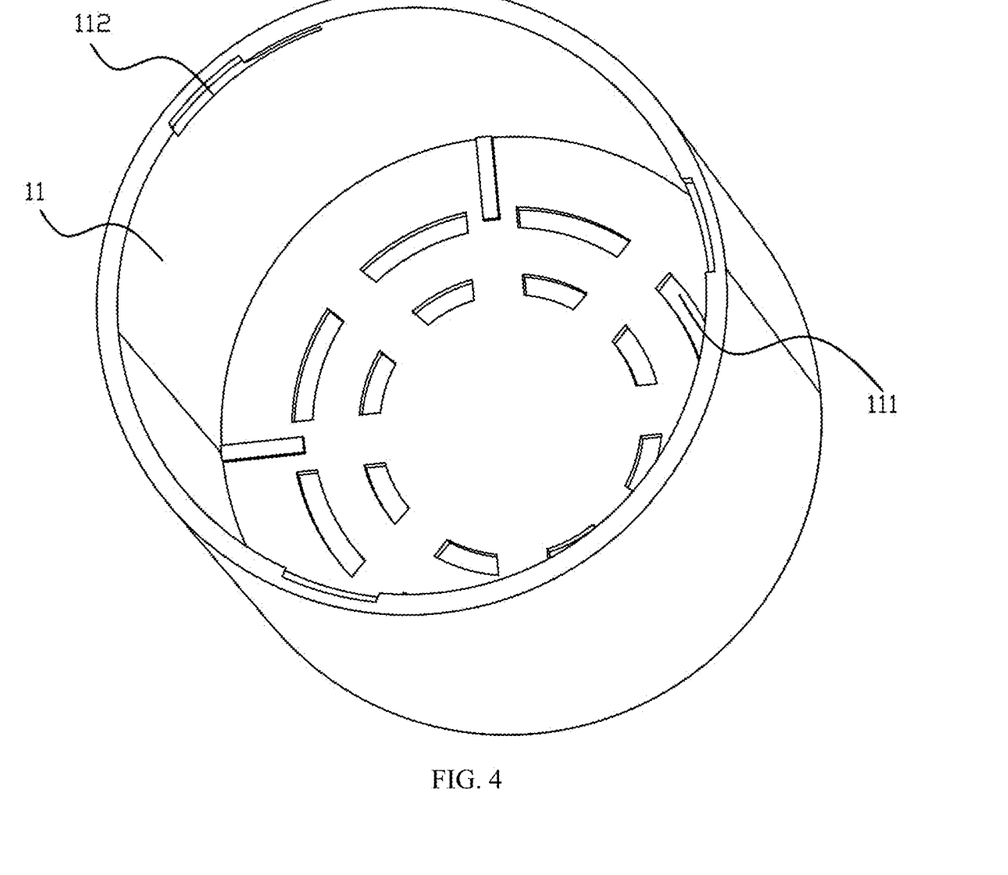
FIG. 4 is a schematic structural diagram of the first housing shown in FIG. 3.

Referring to FIGS. 2-4, in this embodiment, the first housing 11 is a cylindrical cavity with an opening at one end, and a plurality of first through-holes 111 are arranged through one end opposite to the opening, so that tap water can enter the first housing 11 or be discharged from the first housing 11 through the plurality of first through-holes 111; an inner wall of the first housing 11 is provided with a plurality of first slots 112, and the first cover plate 12 is detachably engaged with the first housing 11 through the plurality of first slots 112.

Figure 5:
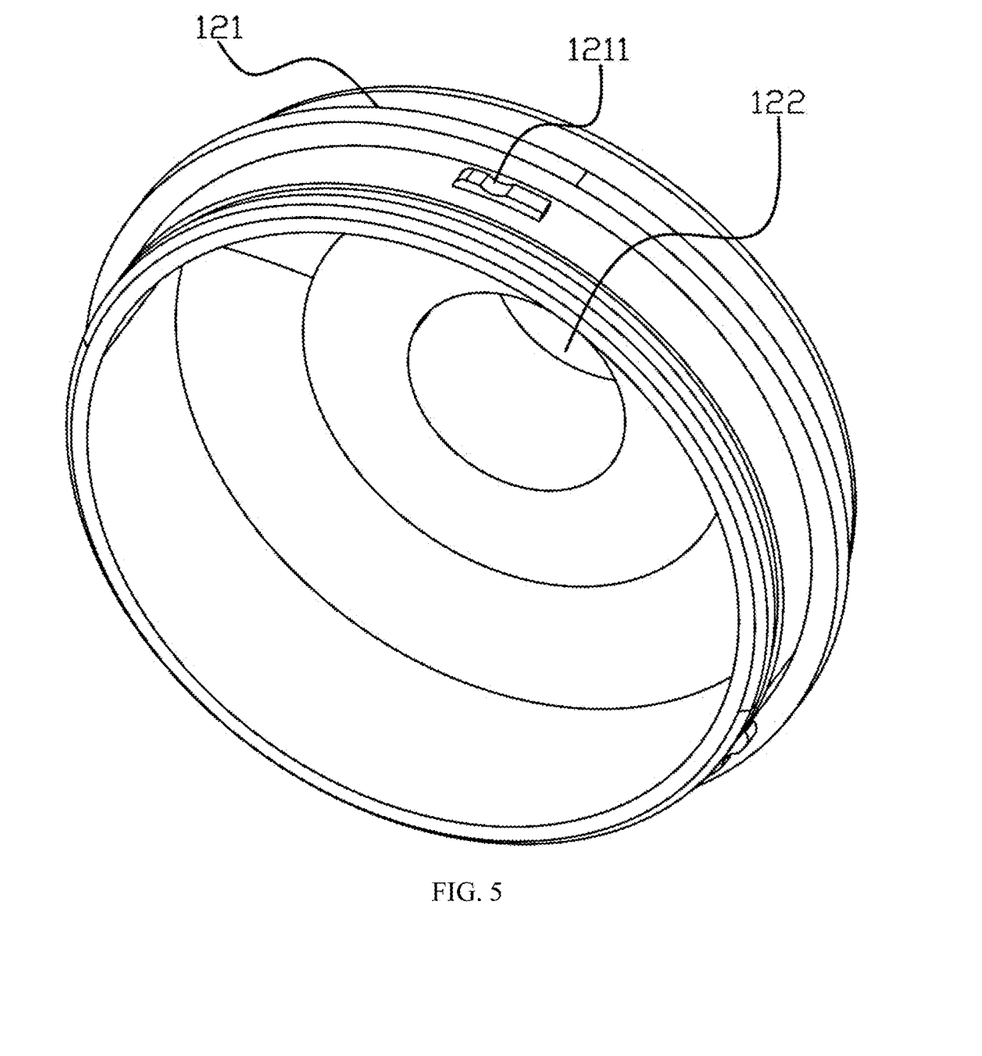
FIG. 5 is a schematic structural diagram of the first cover plate shown in FIG. 3.

Referring to FIGS. 2, 3 and 5, in this embodiment, the first cover plate 12 comprises a cover plate body 121 and a connecting head 122; the cover plate body 121 is detachably engaged with the first housing 11; the connecting head 122 is arranged in communication with the cover plate body 121, and the two are integrally formed. The tap water can enter the first housing 11 through the connecting head 122 or be discharged from it through the connecting head 122.

Specifically, a plurality of first clamping blocks 1211 are arranged on sides of the cover plate body 121, and the first clamping blocks 1211 match with the first slots 112. Through fitting between the two, the first cover plate 12 can be detachably engaged with the first housing 11. In other embodiments, a plurality of first clamping blocks 1211 are arranged on sides of the first housing 11, an inner wall of the first cover plate 12 is provided with a plurality of first slots 112, and the first clamping blocks 1211 match with the first slots 112. Through fitting between the two, the first cover plate 12 can be detachably engaged with the first housing 11. In some other embodiments, the first cover plate 12 can be detachably connected to the first housing 11 by magnetic attraction.

Figure 6:
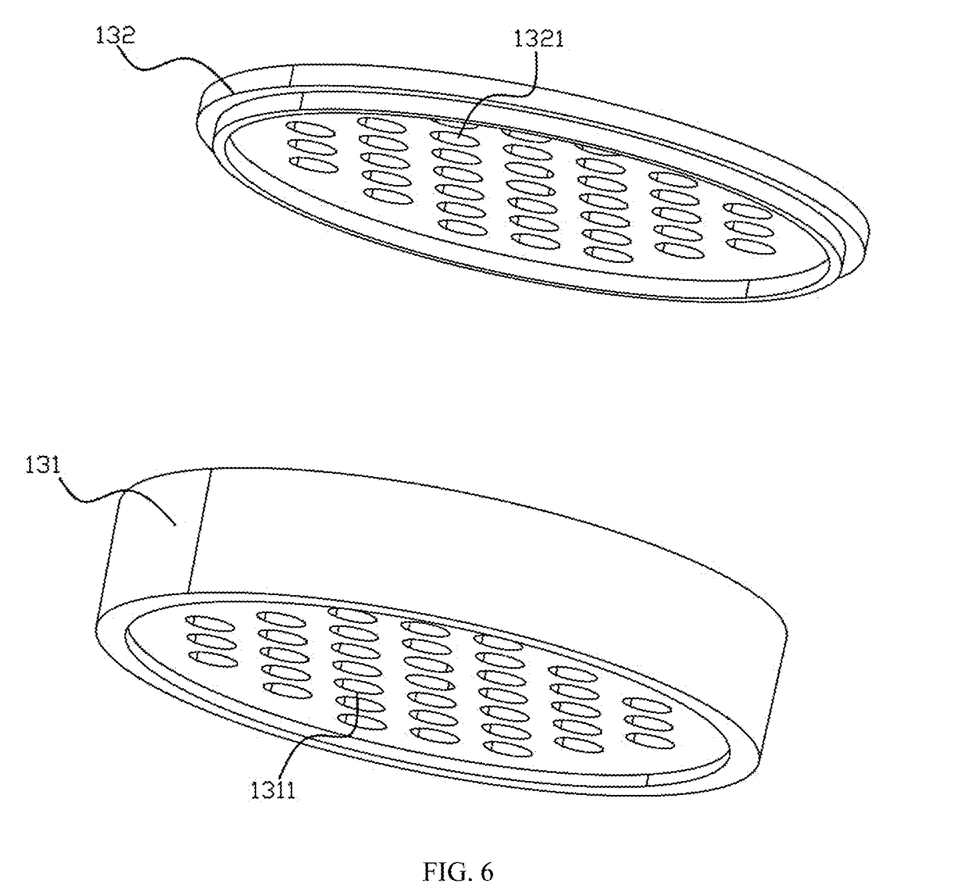
FIG. 6 is a schematic structural diagram of the sub-filter boxes shown in FIG. 3 from an exploded view.

Referring to FIGS. 2, 3 and 6, in this embodiment, the sub-filter box 13 comprises a filter box body 131 and a filter box cover plate 132; the filter box body 131 is a hollow cavity, and the filter material is placed in the filter box body 131; the filter box cover plate 132 can be detachably arranged on the filter box body 131 to facilitate replacement of the filter material in the filter box body 131. Specifically, a plurality of first filter pores 1311 are arranged through the filter box body 131 and a plurality of second filter pores 1321 are arranged through the filter box cover plate 132. Tap water enters and exits the filter box body 131 through the plurality of first filter pores 1311 and the plurality of second filter pores 1321 respectively to perform filtration and sterilization operations by the filter material disposed in the filter box body 131. In some embodiments, the filter box cover plate 132 is detachably engaged with the filter box body 131; in some other embodiments, the filter box cover plate 132 is detachably and magnetically attracted to the filter box body 131.

Both a top surface of the filter box cover plate 132 and a bottom surface of the filter box body 131 of each of the sub-filter boxes 13 are provided with an annular outer ring, so that the sub-filter box 13 forms a stepped structure at each of the annular outer rings; two adjacent sub-filter boxes 13 are stacked through the annular outer ring and form a filtration water storage space inside the annular outer rings between the adjacent sub-filter boxes 13.

Figure 7:
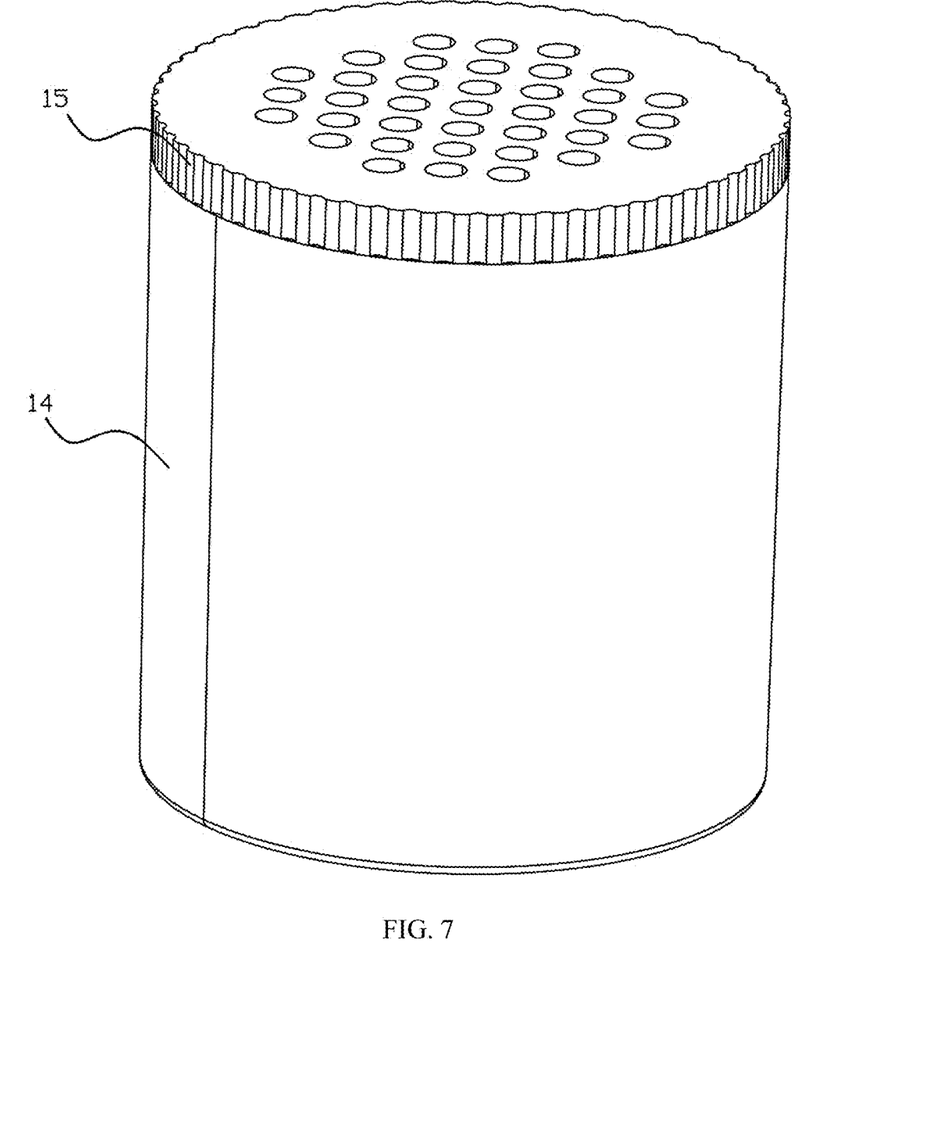
FIG. 7 is a schematic structural diagram of a second embodiment of the combined filter element mechanism according to the present disclosure.
Figure 8:
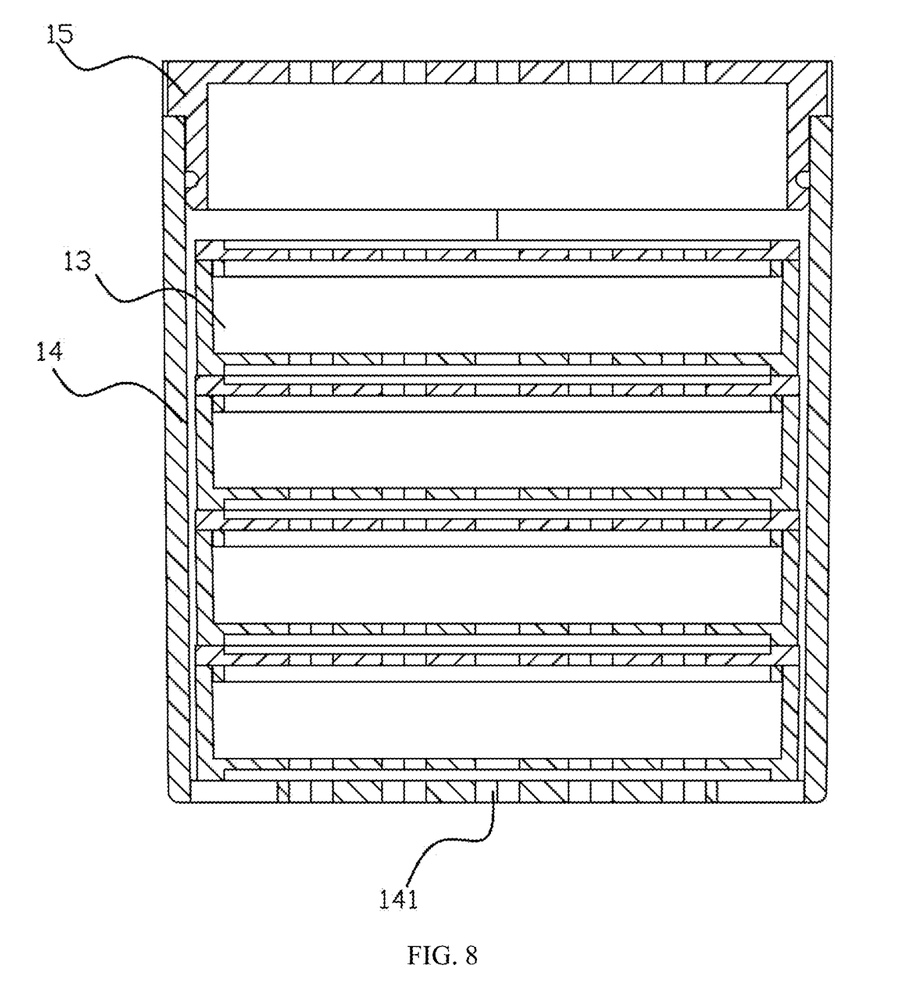
FIG. 8 is a schematic structural diagram of the second embodiment of the combined filter element assembly shown in FIG. 7 from a cross-sectional view.
Figure 9:
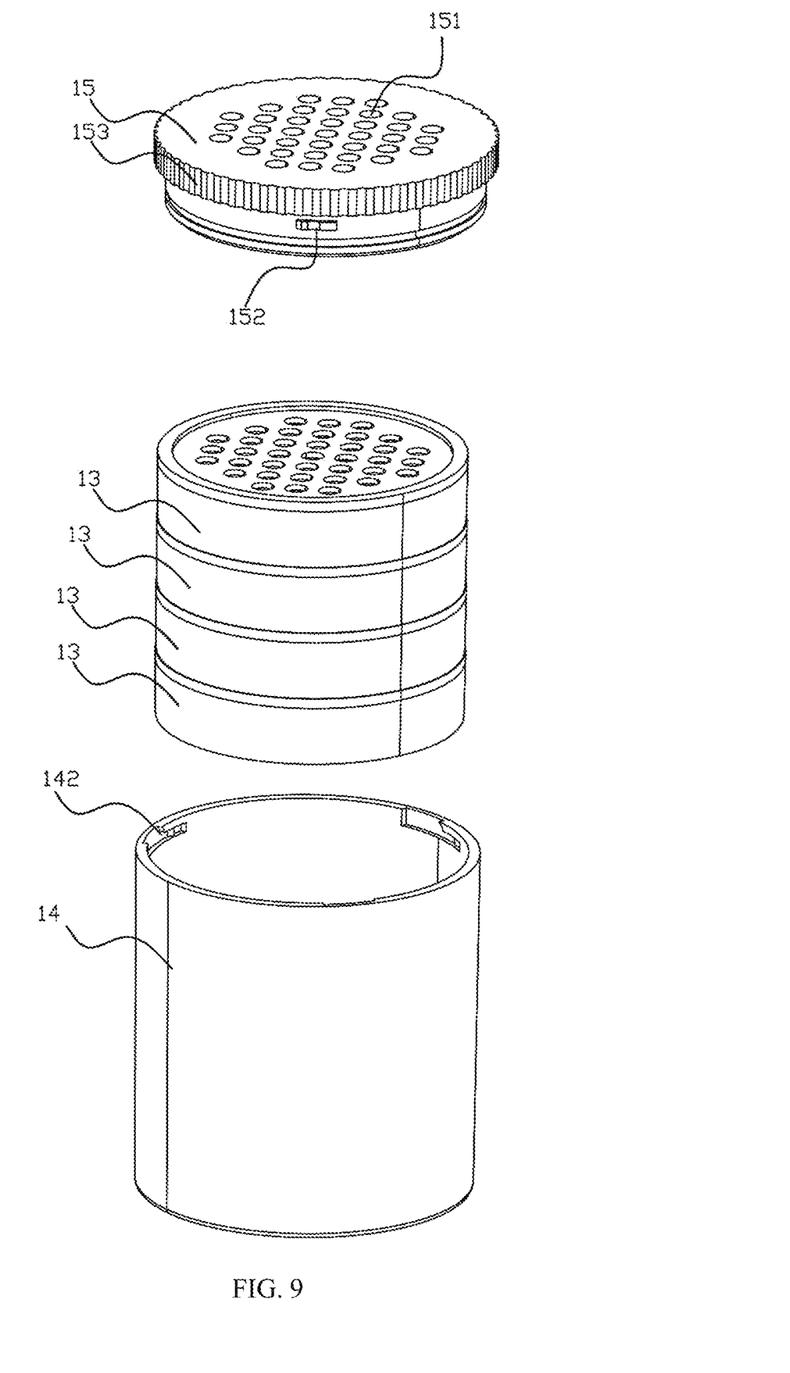
FIG. 9 is a schematic structural diagram of the second embodiment of the combined filter element assembly shown in FIG. 7 from an exploded view.

The arrangement of the filtration water storage space enables a certain gathering effect of water to be filtered to be formed between two adjacent sub-filter boxes 13, which can better improve the filtration performance and further facilitate the mounting of the sub-filter boxes 13;

referring to FIGS. 7-9, in this embodiment, a combined filter element mechanism of the present disclosure mainly comprises a second housing 14, a second cover plate 15 and a plurality of sub-filter boxes 13; the second housing 14 is a hollow cavity; the second cover plate 15 is detachably arranged on the second housing 14, and the two form a closed hollow cavity; a plurality of sub-filter boxes 13 are sequentially arranged in a cavity enclosed by the second housing 14 and the second cover plate 15; the sub-filter box 13 is provided with a filter material, and the filter materials in the plurality of sub-filter boxes 13 are the same or different; specifically, the filter material comprises one or more of activated carbon fiber, calcium sulfite and copper-zinc alloy; in some embodiments, the filter material may include antibacterial silver ions, and the sterilization operation is performed with the antibacterial silver ions; in some other embodiments, the filter material may include fragrance or mint; a user can customize and add different filter materials according to water qualities and personal preferences.

Referring to FIGS. 8 and 9, in this embodiment, the second housing 14 is a cylindrical cavity with an opening at one end, and a plurality of second through-holes 141 are arranged through the bottom thereof, so that tap water can enter the second housing 14 or be discharged from the second housing 14 through the plurality of second through-holes 141; an inner wall of the second housing 14 is provided with a plurality of second slots 142, and the second cover plate 15 is detachably engaged with the second housing 14 through the plurality of second slots 142.

Referring to FIGS. 8 and 9, in this embodiment, a plurality of third through-holes 151 are arranged on the second cover plate 15, so that tap water can enter the second housing 14 or be discharged from the second housing 14 through the plurality of third through-holes 151; a plurality of second clamping blocks 152 are arranged on sides of the second cover plate 15, and the second clamping blocks 152 match with the second slots 142. Through fitting between the two, the second cover plate 15 can be detachably engaged with the second housing 14. In other embodiments, a plurality of second clamping blocks 152 are arranged on sides of the second housing 14, an inner wall of the second cover plate 15 is provided with a plurality of second slots 151, and the second clamping blocks 152 match with the second slots 142. Through fitting between the two, the second cover plate 15 can be detachably engaged with the second housing 14.

In some other embodiments, the second cover plate 15 can be detachably connected to the second housing 14 by magnetic attraction. In this embodiment, a plurality of transverse stripes 153 are arranged around the sides of the second cover plate 15; the frictional force between a user's finger and the second cover plate 15 is increased by the plurality of transverse stripes 153, so that it is convenient to remove the second cover plate 15 from the second housing 14.

It should be noted that the specific working process of the combined filter element mechanism in this present disclosure is as follows: According to water quality or a user's preference, the filter materials are respectively placed in a plurality of sub-filter boxes 13, and then the plurality of sub-filter boxes 13 are placed in the first housing 11 or the second housing 14, and then the first cover plate 12 or the second cover plate 15 is fixedly installed on the first housing 11 or the second housing 14; finally, the assembled filter element mechanism is placed on a shower head or a faucet for filtration operation.

The technical features of the above embodiments can be combined arbitrarily. For concise description, not all possible combinations of the technical features in the above embodiments are described. However, as long as there is no contradiction between the combinations of these technical features, they shall be considered to fall within the scope of this specification.

The above embodiments only express several embodiments of the present disclosure, which are described in more specific and detailed manners, but shall not be construed as a limitation on the scope of the present disclosure. It should be pointed out that ordinary persons skilled in the art can also make several modifications and improvements without departing from the concept of the present disclosure, which belong to the protection scope of the present disclosure. Therefore, the protection scope of the present disclosure shall be subject to the attached claims.

What is claimed is:

1. A combined filter element mechanism applied to a shower head or a faucet, comprising:
    a housing, being a hollow cavity with an opening at one end;
    a cover plate, detachably arranged on the housing, wherein the cover plate and the housing form a closed hollow cavity;
    a plurality of sub-filter boxes, which are sequentially and detachably arranged in the closed hollow cavity, and shapes of each sub-filter box being fitted with each other;
    wherein an inner side of the cover plate forms a water storage space with an adjacent sub-filter box, and an inner side of the bottom of the housing is arranged close to the adjacent sub-filter box; and
    wherein each sub-filter box is respectively provided with a filter material, and the filter materials in the plurality of sub-filter boxes are the same or different; the filter material comprises one or more of activated carbon fiber, calcium sulfite and copper-zinc alloy;
    wherein each sub-filter box comprises a filter box cover plate detachably arranged on a filter box body which is a hollow cavity, and the filter material is placed in the filter box body;
    wherein atop surface of each filter box cover plate and a bottom surface of each filter box body is provided with an annular outer ring integral therewith, so that each sub-filter box forms a stepped structure at both annular outer rings; and wherein two adjacent sub-filter boxes are stacked so that the annular outer ring of the filter box body of a first sub-filter box is atop and contacts the annular outer ring of the filter box cover plate of the second sub-filter box and form a filtration water storage space inside the annular outer rings between the first and second sub-filter boxes.

2. The combined filter element mechanism according to claim 1, wherein the filter material comprises antibacterial silver ion, fragrance or mint.

3. The combined filter element mechanism according to claim 1, wherein a plurality of first through-holes are formed on one end of the housing opposite to an opening, and tap water enters the housing through the plurality of first through-holes.

4. The combined filter element mechanism according to claim 3, wherein an inner wall of the housing is provided with a plurality of slots.

5. The combined filter element mechanism according to claim 4, wherein the cover plate comprises a cover plate body detachably arranged on the housing; and a connecting head arranged in communication with the cover plate body, which is integrally formed with the cover plate body.

6. The combined filter element mechanism according to claim 4, wherein a plurality of clamping blocks are arranged on sides of the cover plate, and the clamping blocks are detachably engaged with the slots.

7. The combined filter element mechanism according to claim 4, wherein a plurality of transverse stripes are arranged around the sides of the cover plate.

8. The combined filter element mechanism according to claim 1, wherein the cover plate and the housing are detachably connected by magnetic attraction.

9. The combined filter element mechanism according to claim 1, wherein a plurality of first filter pores are arranged through the filter box body.

10. The combined filter element mechanism according to claim 9, wherein a plurality of second filter pores are further arranged through the filter box cover plate.

11. The combined filter element mechanism according to claim 1, wherein the filter box cover plates are detachably and magnetically attracted to a respective filter box body.

* * * * *